United States Patent [19]

Martin et al.

[11] Patent Number: 5,103,859
[45] Date of Patent: Apr. 14, 1992

[54] FLOAT CHAMBER

[75] Inventors: Christopher R. Martin, Revesby; Raymond D. Massey, Cambridge, both of Australia

[73] Assignee: Zip Heaters (Australia) Pty Limited, New South Wales, Australia

[21] Appl. No.: 595,322

[22] Filed: Oct. 10, 1990

[30] Foreign Application Priority Data

Oct. 11, 1989 [AU] Australia .................... PJ6802

[51] Int. Cl.5 .................... F16K 31/22; F16K 33/00
[52] U.S. Cl. .................... 137/448; 122/451.1; 137/428; 239/63; 239/506; 239/524
[58] Field of Search .................... 137/434, 438, 442, 443, 137/444, 448, 428, 451; 251/364, 365; 122/448.1, 451.1; 126/350 R, 374; 239/63, 505, 506, 521, 524

[56] References Cited

U.S. PATENT DOCUMENTS

| 924,432 | 6/1909 | Cornelius | 137/444 |
|---|---|---|---|
| 947,234 | 1/1910 | Herschler | 137/444 |
| 1,489,403 | 4/1924 | Wasdell | 137/448 |
| 2,294,785 | 9/1942 | Langdon | 137/451 |
| 3,029,030 | 4/1962 | Dey, Sr. | 239/524 |
| 3,042,070 | 7/1962 | Kofford | 137/448 |
| 3,207,170 | 9/1965 | Fulton | 137/451 |
| 3,334,649 | 8/1967 | Thompson | 137/448 |
| 4,624,414 | 11/1986 | Ferrazza | 239/524 |

FOREIGN PATENT DOCUMENTS 114072 7/1926 Switzerland .................... 137/443

Primary Examiner—George L. Walton
Attorney, Agent, or Firm—Nilsson Robbins Dalgarn Berliner Carson & Wurst

[57] ABSTRACT

A valve for use in the float chamber of a boiling water unit. The valve consists of a body of circular horizontal cross section having a vertical outer wall. The inner portion of the valve body includes a central circular cut-out seat portion to accommodate a cylindrical seal, the wall of the valve seat between the cut-out portion and the outer wall being sloped in the manner of the surface of the frustrum of a cone, the seat being positioned below a nozzle so that when the nozzle is spaced from the valve body, flow from the nozzle contacts the valve body and is deflected along said sloped outer wall to activate a temperature sensor.

6 Claims, 1 Drawing Sheet

FLOAT CHAMBER

This invention relates to float chambers and is more particularly concerned with float chambers useful in boiling water units such as depicted and described in the specification of Australian Patent 531449, the disclosure of which is incorporated herein by reference.

In such a conventional boiling water unit, a float chamber is located beside the upper portion of the boiling water tank, the arrangement being such that the water level in the float chamber is identical with that in the boiling water tank. When boiling water is drawn off from the tank, the water level in both the float chamber and the boiling water tank is lowered and a float, arranged to float on the water in the float chamber, falls with the falling water level in the float chamber. A float arm connected to the float opens a valve when the float has fallen to a predetermined level, the valve when opened allows cold water under mains pressure to enter the float chamber.

One problem associated with cistern fed type boiling water units resides in the capacity to activate the thermostat sensor to switch on the heating element in the boiling water tank as soon as possible after water has been drawn from the boiling water tank.

In conventional such boiling water units, a jumper valve has been provided to alternatively shut off and allow flow of water from the mains supply to the float chamber. Above the maximum water level in the float chamber conventional boiling water unit incorporate a gauze sleeve housing a sensor. This sensor is provided for the detection of water temperature in the float chamber and is adapted to activate the heating element in the main tank when a drop in water temperature in the float chamber is detected.

Conventional boiling water units have been provided with a tongue on the float arm for the diversion of some of the water entering the float chamber from the mains to the aforesaid gauze sleeve, whereupon the sensor, once sensing the temperature of the water entering the float chamber from the mains, will activate the aforesaid heating element. This arrangement has proven satisfactory, but nevertheless is an arrangement which, for optimum operation of the unit, might be improved upon. A further problem which has arisen with conventional boiling water units resides in the fact that the jumper valve adapted to close off the mains water supply has incorporated a seal of rubber or a rubber substitute adhered to the valve seat. This seal has tended, with closing pressure, to buckle, thus providing a less than perfect seal with the mains water inlet. Clearly, this is undesirable and a further feature which can be improved upon.

It is an object of this invention to ameliorate the above stated disadvantages of conventional boiling water units.

This invention in one broad form provides a jumper valve incorporating a central valve seat, a seal located in but not affixed to said seat and a ramp surface at least partially surrounding said seat.

By way of example only one embodiment of apparatus in accordance with this invention will now be described with reference to the accompanying drawings wherein FIG. 1 is a section of a float chamber of a boiling water unit;

Figure 1:
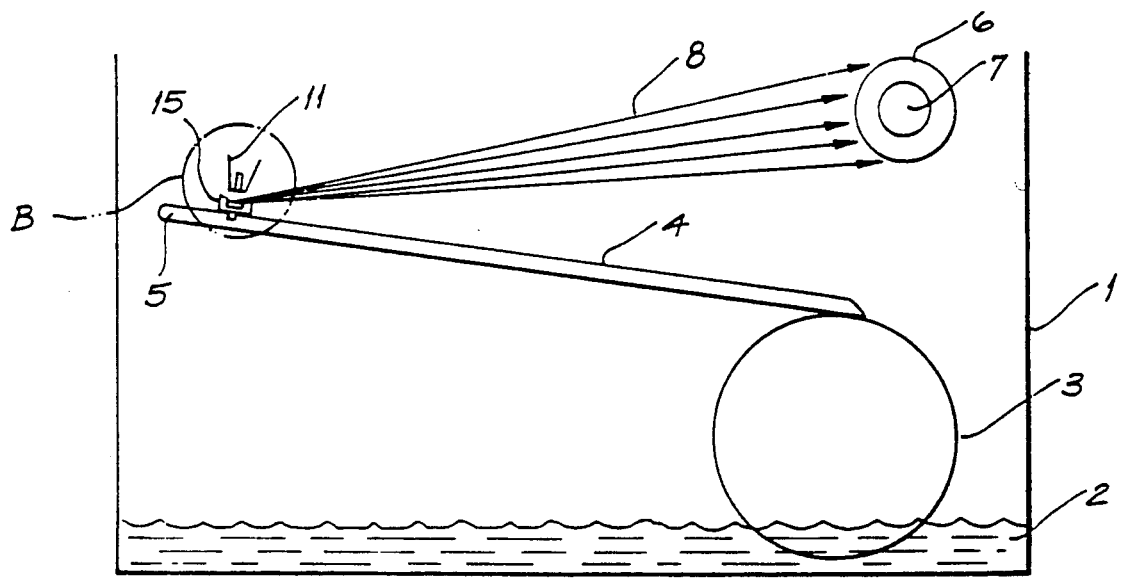
Figure 2:
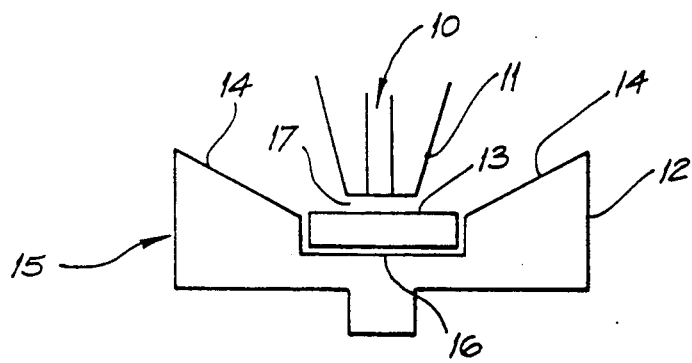
FIG. 2 depicts the jumper valve indicated at B in FIG. 1 in its open position.

In the drawings, float chamber 1 contains water 2 at a level which indicates that boiling water has been extracted from the main tank (not shown). Float 3 and float arm 4 operate by virtue of pivot 5. Jumper valve shown generally at 15 is open as depicted in FIG. 2 so that water 10 is permitted to enter float chamber 1 through nozzle 11. Jumper valve 15 is provided with ramp surface 14 and side wall 12. Water 10 entering float chamber 1 under pressure first strikes jumper valve sealing member 13 and is then dissipated into float chamber 1, some of water 10 being included in spray 8 which strikes gauze sleeve 6 which houses sensor 7. Some of the water incorporated in spray 8 will strike sensor 7 which will operate the heating element for the main tank.

Figure 3:
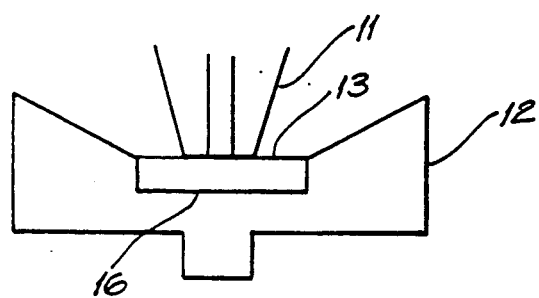
FIG. 3 depicts the jumper valve of FIG. 1 in its closed position.

As water continues to enter float chamber 1, float 3 will rise as the surface level of water 2 rises. In due course, jumper valve 15 will assume the position indicated in FIG. 3 relative to pipe 11, closing off ingress of water to float chamber 1. Clearly, under the pressure of water 10, seal 13 will expand and for this reason an expansion gap is left between seal 13 and valve seat 16 as depicted in FIG. 2. Under expansion of sealing member 13, this expansion gap will be fully occupied by the expanded sealing member 13 which will nest against valve seat 16. When the water level in float chamber 1 is again lowered, and water again enters float chamber 1 from pipe 11, jumper valve 15 will again assume its location relative to pipe 11 as indicated in FIG. 2 and seal 13 will contract as shown in FIG. 2. The preferred thickness of sealing 13 is in the order of 2 millimeters and the preferred opening gap 17 is approximately 1 millimeter.

What is claimed is:

1. A boiling water unit comprising:
   a nozzle adapted to permit egress of water to a unit float chamber;
   a temperature sensor;
   a float;
   a pivot arm fixed at one end to the upper portion of the float and adapted to pivot about its opposite end; and
   a valve seat affixed to the pivot arm, the valve seat having a central hollowed portion at least partially surrounded by a ramp surface, and a sealing member shaped for accommodation thereof in said hollowed valve seat portion, the arrangement being such that water entering said float chamber through said nozzle first contacts said sealing member and is deflected from said sealing member along said ramp surface to contact and activate said temperature sensor control a condition of the water in said float chamber for moving said float to control the position of said nozzle.

2. A boiling water unit as defined in claim 1 wherein said sealing member has a substantially flat surface adapted for sealing contact with said nozzle.

3. A boiling water unit as defined in claim 2 wherein said sealing member comprises rubber or a rubber substitute material.

4. A boiling water unit as defined in claim 1 wherein said sealing member is of such dimensions as to loosely fit within said hollowed valve seat portion at normal operating temperatures of the unit, but is adapted to expand under pressure occasioned by contact of said nozzle, forcing said sealing member against said valve seat, to at least substantially close said hollowed valve seat portion when said float rises in said float chamber causing said pivot arm to elevate said valve seat and the sealing member to close said nozzle.

5. A boiling water unit as defined in claim 4 wherein the sealing member is cylindrical and is of a thickness greater than the width of the gap between said nozzle and said sealing member when said float rests on the chamber bottom.

6. A boiling water unit as defined in claim 1 wherein said ramp surface is frusto-conical and completely surrounds said hollowed valve seat portion.

* * * * *

UNITED STATES PATENT AND TRADEMARK OFFICE
CERTIFICATE OF CORRECTION

PATENT NO. : 5,103,659

DATED : April 14, 1992

INVENTOR(S) : Christopher R. Martin, et al.

It is certified that error appears in the above-identified patent and that said Letters Patent is hereby corrected as shown below:

Column 2, line 56, insert the word --to-- before "control".

Signed and Sealed this

Twenty-first Day of December, 1993

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,103,859
DATED : April 14, 1992
INVENTOR(S) : Christopher R. Martin, et al.

It is certified that error appears in the above-indentified patent and that said Letters Patent is hereby corrected as shown below:

Column 2, line 40, change " egress " to -- ingress --

Column 2, line 58, insert -- said sealing member relative to -- after " position of ".

Signed and Sealed this

Twenty-second Day of November, 1994

Attest:

BRUCE LEHMAN

*Attesting Officer*            *Commissioner of Patents and Trademarks*